United States Patent [19]
Nishimura

[11] Patent Number: 5,999,609
[45] Date of Patent: Dec. 7, 1999

[54] COMPUTER-TELEPHONY (CT) SYSTEM INCLUDING AN ELECTRONIC CALL REQUEST

[75] Inventor: Masahiko Nishimura, San Jose, Calif.

[73] Assignee: Sun Microsystems, Inc., Palo Alto, Calif.

[21] Appl. No.: 08/835,150

[22] Filed: Apr. 4, 1997

[51] Int. Cl.[6] .................................................. H04M 3/42
[52] U.S. Cl. ...................... 379/201; 379/93.17; 379/219; 379/229; 379/265
[58] Field of Search .................................. 379/201, 207, 379/211, 219, 220, 221, 229, 230, 265, 266, 309, 90.01, 93.17, 93.01

[56] References Cited

U.S. PATENT DOCUMENTS

| | | | |
|---|---|---|---|
| 5,001,710 | 3/1991 | Gawrys et al. | 379/201 |
| 5,008,930 | 4/1991 | Gawrys et al. | 379/210 |
| 5,241,580 | 8/1993 | Babson, III | 379/201 |
| 5,241,588 | 8/1993 | Babson, III et al. | 379/201 |
| 5,315,646 | 5/1994 | Babson, III et al. | 379/201 |
| 5,323,452 | 6/1994 | Dickman et al. | 379/201 |
| 5,345,380 | 9/1994 | Babson, III et al. | 379/201 |
| 5,450,480 | 9/1995 | Man et al. | 379/201 |
| 5,471,526 | 11/1995 | Linnermark et al. | 379/268 |
| 5,511,116 | 4/1996 | Shastry et al. | 379/201 |
| 5,517,563 | 5/1996 | Norell | 379/221 |
| 5,519,772 | 5/1996 | Akman et al. | 379/266 |
| 5,533,115 | 7/1996 | Hollenbach et al. | 379/201 |
| 5,541,986 | 7/1996 | Hou | 379/201 |
| 5,555,299 | 9/1996 | Maloney et al. | 379/201 |
| 5,572,581 | 11/1996 | Sattar et al. | 379/211 |
| 5,594,904 | 1/1997 | Linnermark et al. | 379/268 |
| 5,608,789 | 3/1997 | Fisher et al. | 379/201 |
| 5,610,977 | 3/1997 | Williams et al. | 379/211 |
| 5,627,888 | 5/1997 | Croughan-Peeren | 379/211 |
| 5,644,631 | 7/1997 | Sattar et al. | 379/211 |
| 5,684,870 | 11/1997 | Maloney et al. | 379/201 |
| 5,737,406 | 4/1998 | Dagberg et al. | 379/220 |
| 5,754,627 | 5/1998 | Butler et al. | 379/266 |
| 5,784,451 | 7/1998 | Smith, Jr. | 379/265 |

*Primary Examiner*—Scott Wolinsky
*Attorney, Agent, or Firm*—Skjerven, Morrill, Macpherson, Franklin & Fried, L.L.P.; Stephen A. Terrile

[57] ABSTRACT

Communications and messaging in a Computer-Telephony (CT) system are assisted using an Electronic Call Request (ECR), a computer and network system construct that operates in place of a telephone call. An ECR is invoked and made a storage and communication entity in a computing and network environment in which the ECR is logged in a queue. The ECR in the form of a storage and communication entity navigates the telephone network under the direction of the caller who graphically manipulates the ECR using a graphical user interface (GUI). The ECR is activated into a telephone call at the command of a human or computer or network system agent generating a telephone call both to the caller and the call target.

39 Claims, 7 Drawing Sheets

COMPUTER-TELEPHONY (CT) SYSTEM INCLUDING AN ELECTRONIC CALL REQUEST

BACKGROUND OF THE INVENTION

1. Field of the Invention

The present invention relates to a Computer-Telephony (CT) system. More specifically, the present invention relates to a system and operating method for electronically tracking and controlling telephone calls in a network environment.

2. Description of the Related Art

Organizations such as businesses and government agencies have historically limited telephone utilization to audio communications using traditional telephone equipment. Generally, a business distributes telephone equipment among the working place to support internal and external communications. Businesses also typically concentrate telephone equipment in a call distribution center to supply on-phone remote support of customers including product support and sales support. Telephone usage of businesses has greatly expanded over recent decades but remains similar in purpose to supply audio communications.

Recent decades have also shown great growth in organizational computing. Businesses have evolved from operations with little or no computing power to organizations with one or few mainframe computers to present-day organizations with networked computers or multiple computers on each employees desk. As computers have grown into present-day networks, still only minimal mixing of telephony and computing has taken place.

Thus, the large switches of telephone systems remain with substantially no connectivity with switches or equipment beyond the voice lines to the public networks. The telephone system has been considered a distinct entity, separated from computing networks without breach. The telephone system has been considered a standard utility rather than an extension of a network computing model.

In the past several years, some forward-looking companies have begun integrating telephony system components and computer networks as an extension of support systems and improved service.

Companies such as Intel™, CountryWide Mortgage and AT&T have implemented computer-telephony integration projects to meet business needs. These companies have implemented in-bound and out-bound systems in which telephone systems are integrated with computer systems. Using computer-telephony integration, the system identifies callers, determines the requests made by the callers, efficiently routes the calls, and extracts information from the callers so that calls are routed more rapidly to a most suitable destination with additional information supplied to answering personnel. With the additional information supplied to answering personnel, the personnel more easily reacts to the calls by tailoring the response to the caller and type of call. For out-bound calls originating from employees of the organization, an increasing number of organizations are utilizing systems that determine whether a real person has answered a telephone and connecting a telephone answering agent only when the person is available, thereby reducing telephone tag.

An integrated computer telephony system connects a plurality of telephone sets and a plurality of generalized processors, computers, workstations, terminals, network nodes and the like. A Computer Telephony (CT) system serves as a mixed telephony and computer communication system in which generalized processors on a network perform processing in conjunction with databases to supply a high degree of configuration of call processing and routing functions. A Computer Telephony (CT) system forms extended networking functionality by utilizes a private branch exchange (PBX) as a specialized network peripheral.

Computer-telephony applications bridge many markets and types of users, for example extending from marketing and sales to engineering and manufacturing. Using computer-telephony integration, users utilize desktop workstations to perform the same functions the telephone as well as extend the operations with data integration ranging from an electronic rolodex, E-mail, and text-to-speech, to call center management, remote communication, and teleconferencing.

In a computer-telephony ion system, traditional telephone sets are considered audio-only terminals in a network. Television sets are audio-visual terminals with realtime viewing capabilities. Computers with high bandwidth network capabilities are considered full audio-visual-data terminals with independent processing functionality. The traditional notion of telephony as the science and technology of the telephone is inaccurate and limited. Modern telephony should be considered as a provider of realtime audio-visual-data connection of two or more people or parties.

In present-day telephone systems, callers into an organization typically call a central telephone number which is usually not mnemonic and therefore difficult to ascertain without consulting a directory or other listing. A caller then typically requests to be routed to a particular person or organizational unit. When the particular person or a group of people are not available, the user has no recourse than to wait for an answer, wait until a timeout occurs, or leave a message on a voice messaging system.

What is needed is a system and operating method for facilitating communications and messaging in an organizational business unit.

SUMMARY OF THE INVENTION

Communications and messaging are assisted using an Electronic Call Request (ECR), a computer and network system construct that operates in place of a telephone call. An ECR is invoked and made a storage and communication entity in a computing and network environment in which the ECR is logged in a telephone queue. The ECR in the form of a storage and communication entity navigates the telephone network under the direction of the caller who graphically manipulates the ECR using a graphical user interface (GUI). The ECR is activated into a telephone call at the command of a human or computer or network system agent generating a telephone call both to the caller and the call target.

The Electronic Call Request is particularly useful for contacting unfamiliar organizations, or finding a particular call recipient in the organization. A typical user of the Electronic Call Request system is a caller into a call center such as a telephone caller service organization in which callers are frequently transferred without caller control.

In accordance with an aspect of the present invention, a computer-telephony system exercises electronic control of telephones and telephone calls using a workstation desktop computer. Electronic control extends to routing and queuing of calls to telephone answering agents. The computer-telephony system includes a server that allows queuing and routing of messages across telephone switches (PBXes) to other switches connected to the system. The system supports hold, transfer, conference, and automatic call distribution (ACD) functions that are standard to telephony and additionally extends these functions into integrated computer-telephony operations.

The computer-telephony system pre-classifies the probable identity of a caller using callerID or Automatic Number Identification (ANI) and, based on the probable identity, invokes a screen pop of the caller to the display of answering agents. For outbound calls, support is included for answering agents to add textual data to a data stream associated with the call and to invoke the computer-telephony system to dial a preselected set of telephones associated with a set of service orders until a customer answers the return call.

In accordance with an aspect of the present invention, the computer-telephony system includes a graphical user interface (GUI) for the answering agents for usage in place of a telephone for most standard telephone operations.

In accordance with an aspect of the present invention, data that is stored in a database is used to enhance routing of calls to a group of agents who are designated to answer calls. The enhanced routing of calls is particularly useful in an Automatic Call Distribution (ACD) system that automatically distributes calls received by a particular extension to several agents. The enhanced routing of calls involves receiving user routing requests from internal users via intranet and from external customers via Internet and interacting with an internal database to obtain information associated with the caller. The call is routed based on the information content of the call and the information associated with the caller. The telephone number of the caller is determined using Automatic Number Identification (ANI) to determine the number of the line that originated the call and using the Dialed Number Identification System (DNIS) to determine the number actually dialed by the caller. The DNIS identification is useful for Automatic Call Distribution (ACD) where calls are routed through multiple Vector Directory Numbers (VDN). The routed call creates a pop-up on-screen display of information on a display terminal of the person to whom the call is routed.

In accordance with an aspect of the present invention, a computer-telephony system includes an artificial intelligent agent, typically implemented in software, that functions as an interface to the customer for multiple customer service systems. The artificial intelligent agent acts on behalf of the customer and as a virtual support engineer to assist a customer to define problems, trouble-shoot problems, and solve the problems. A customer invokes the artificial intelligent agent by typing phrases or through use of a graphical user interface (GUI).

In accordance with an embodiment of the present invention, the artificial intelligent agent is used to refine problem statements, access a product assistance help function such as a SunSolve™ system, or log a service order for tracking problems. The artificial intelligent agent is further used to invoke Electronic Call Requests (ECR) to request a call with or without waiting on the telephone. The artificial intelligent agent obtains a status of problems, requests, and other issues addressed by the computer-telephony system. The artificial intelligent agent also performs a surveillance function that searches and returns information regarding status changes of service orders as the orders pass through various internal service organizations.

In accordance with an embodiment of the present invention, an Electronic Call Request (ECR) is a software object that serves as an agent for initiating a call to a destination from a source and monitoring the destination to determine when the call is answered. The Electronic Call Request (ECR) establishes a connection between the destination and the source when both the source and destination entities are available.

In accordance with an embodiment of the present invention, the Electronic Call Request (ECR) is created using software. The Electronic Call Request (ECR) executes a queuing algorithm and performs checking and modification of status, priority, and other data. When the ECR agent establishes that both the calling party at the source and the answering party at the destination are available, the ECR rings the telephones of the calling party and the answering party. A connection is complete when the calling party and the answering party pick up their telephones.

In some cases, a caller which is internal to a Computer Telephony (CT) system makes a call to a destination external to the system. In these cases, the Electronic Call Request (ECR) agent either calls the number and makes the connection directly, or the agent monitors the external line and calls back the internal caller when an answering party answers the telephone at the external destination.

In accordance with an embodiment of the present invention, a method of tracking and controlling a telephone call includes receiving a telephone call request from a caller, creating an Electronic Call Request (ECR) software object in response to the receipt of the telephone call request, and routing the Electronic Call Request (ECR) to a destination.

Many advantages are attained by the described apparatus and system. Advantageously, the Electronic Call Request (ECR) agent relieves a caller from the necessity of waiting, ear-to-telephone, for an answer at the destination telephone. The Electronic Call Request (ECR) facilitates the ability of a user to specify the problem, request or issue that is the subject of the user request since the request is communicated using a GUI, rather than an interactive voice response (IVR) system.

It is highly advantageous that the Electronic Call Request (ECR) reduces the amount of time wasted on telephone communications, both for the caller and for an answering service agent. The amount of time saved is substantial. For example, if thiry seconds are saved per call for tens or hundreds of thousands of calls, millions of dollars are saved through ECR usage.

BRIEF DESCRIPTION OF THE DRAWINGS

The features of the described embodiments believed to be novel are specifically set forth in the appended claims. However, embodiments of the invention relating to both structure and method of operation, may best be understood by referring to the following description and accompanying drawings.

DETAILED DESCRIPTION OF THE PREFERRED EMBODIMENTS

Sun, Sun Microsystems, the Sun logo, SunSoft, Solaris, ToolTalk, and OpenWindows are trademarks or registered trademarks of Sun Microsystems, Inc. Wabi XIL, and XGL are trademarks or registered trademarks of Sun Microsystems, Inc.

All SPARC trademarks are trademarks or registered trademarks to SPARC International, Inc. SPARCstation, SPARCstation10, SPARCserver, SPARCcenter, SPARCengine, SPARCworks, and SPARCompiler are licensed exclusively to Sun Microsystems, Inc. Products bearing SPARC trademarks are based on an architecture developed by Sun Microsystems, Inc.

Figure 1:
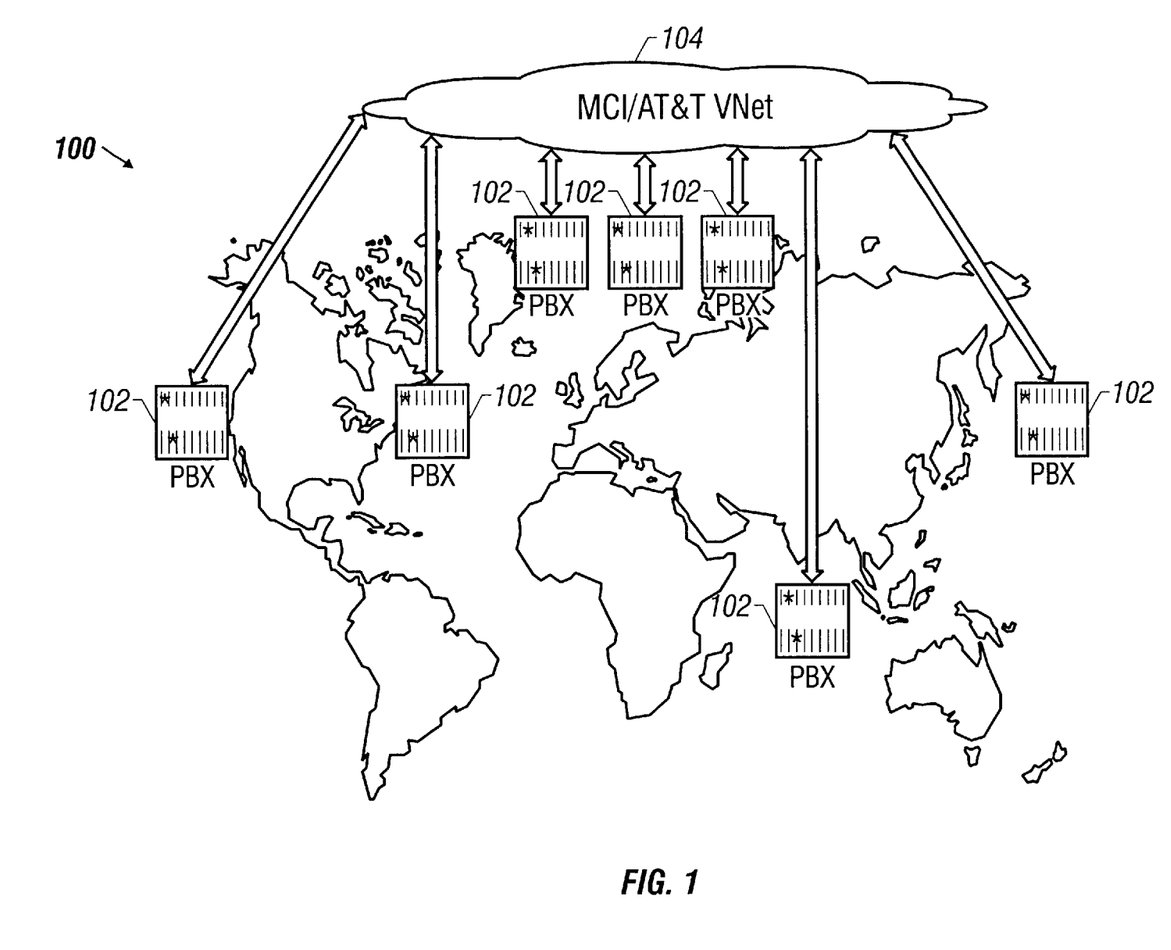
FIG. 1 is a schematic block diagram illustrating an embodiment of a global network that is suitable for implementing an Electronic Call Request operation.

Referring to FIG. 1, a schematic block diagram illustrates an embodiment of a global network 100 that is suitable for implementing an electronic call request operation. The global network 100 includes a plurality of interconnected private branch exchange (PBX) telephone switches 102. A PBX switch is a private switching system typically serving an organization such as a business or government agency. A PBX switch is connected to other switches using high-speed trunk lines. The PBX switches 102 are interconnected by virtual direct connections using a virtual network 104. In the illustrative embodiment, the virtual network 104 is an MCI and AT&T VNET virtual network although other networks that are suitable for communicating digital data along with voice signals may be used. Loading of the global network 100 is balanced through the operations of the PBX switches 102 and the load balancing capabilities of local telephone companies. A suitable PBX switch 102 is a Lucent Technologies' G3 series PBX, although individual PBX switches 102 are selected based on local capacity conditions.

Figure 2:
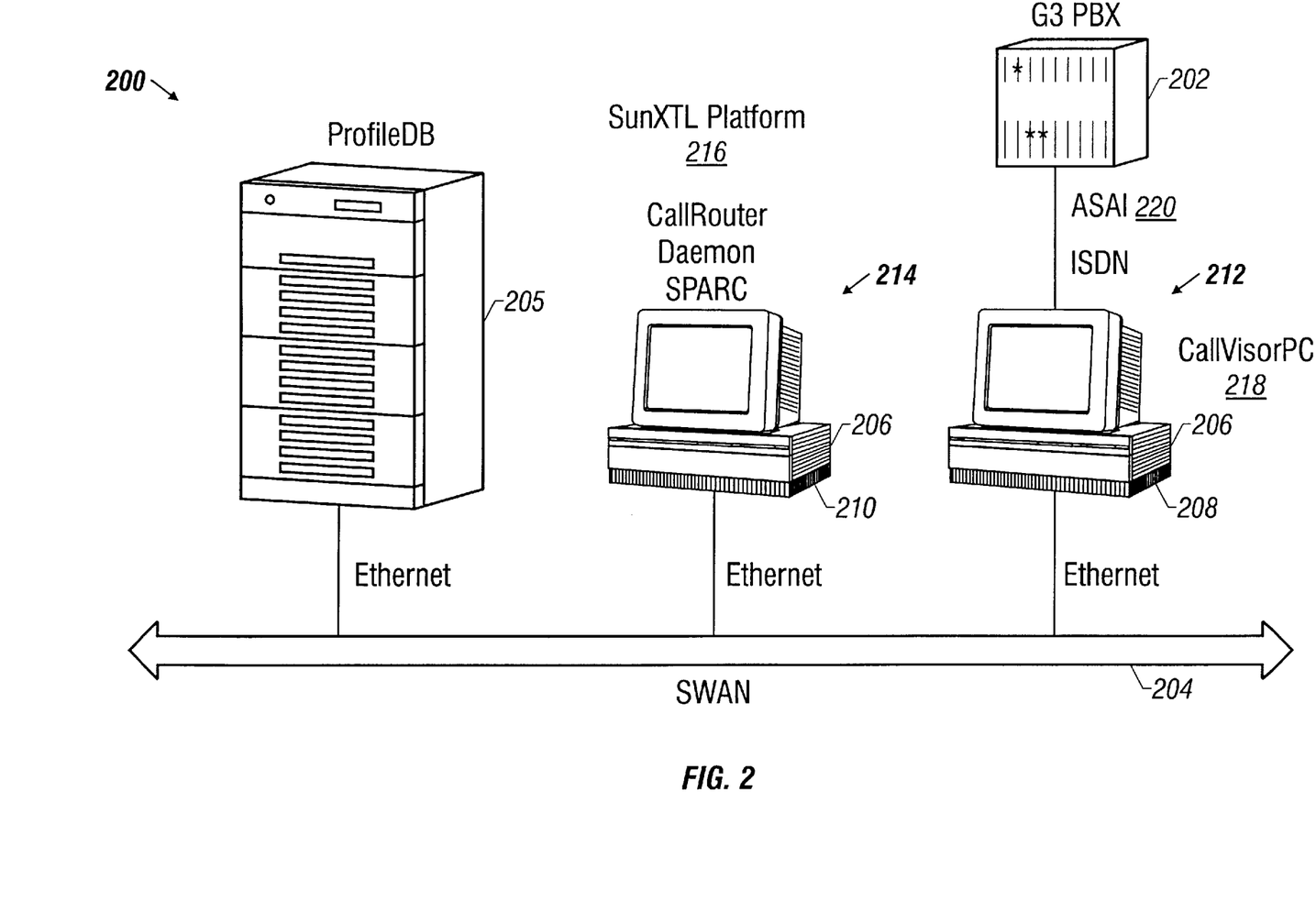
FIG. 2 is a schematic block diagram showing an example of a suitable local PBX system and including a call center central server which implements an Electronic Call Request operation.

Referring to FIG. 2, a schematic block diagram shows an example of a suitable local PBX system 200 which corresponds to a PBX switch 102 shown in FIG. 1. A typical local PBX system 200 includes a PBX interface 202, a network link 204, a profile database storage 205, and a plurality of computing devices 206 such as computers, workstations and the like. One of the computing devices 206 serves as a PBX interface computer 208 and is connected to the PBX interface 202 by a suitable link, for example an integrated switch digital network (ISDN) connection. A second of the computing devices 206 serves as a call router computer 210. The computing devices 206 and profile database storage 205 are connected to the network link 204 by a suitable interconnection such as an ethernet connection.

In the illustrative embodiment, the PBX interface computer 208 is a Solaris™ x86 PC executing CallvisorPC™ software from Lucent Technologies. The call router computer 210 is a SPARCstation™ executing CallRouter Daemon software. The local PBX system 200 operates a SunXTL™ Platform. The SunXTL™ Platform is a multiple-layered software architecture based on a client-server computing model. The PBX interface computer 208 performs a two-way translation of SunXTL™ requests and AT&T Adjunct Switching Application Interface (ASAI) protocol requests communicated between the PBX interface computer 208 and the PBX interface 202. The Adjunct Switching Application Interface (ASAI) is a hardware protocol used by PBXs to obtain commands from external sources. (An adjunct is defined as equipment that is not included in the PBX, but supplies services to the PBX.) The call router computer 210 executes portions of the SunXTL™ that operate the CallRouter Daemon. The various software systems executing on the local PBX system 200 combine to form a call center central server 212, termed a "World Wide Call Center" (WWCC). The call center central server 212 includes CallRouter Daemons 214, the SunXTL™ Platform 216, provider software for enhanced PBX interfaces 202, the CallvisorPC software 218, and the ASAI 220. Interfaces operating external to the local PBX system 200 are referred to as clients. The enhanced PBX 202 is a private branch exchange that accommodates adjunct processing to a Sun-SPARC™ system. Examples of an enhanced PBX is a AT&T Generation 3 class PBX and a Northern TeleCom Meridian PBX, each of which supplies Computer Telephony (CT) system capabilities to a local area network (LAN).

The SunXTL™ Platform 216 includes support for computer-telephony software applications, hardware, and driver interfaces. The SunXTL™ Platform 216 is particularly useful for exploiting client-server, distributed computing environments. The SunXTL™ Platform 216 is highly useful for augmenting the Solaris operating environment and resource management functions such as windows, graphics and imaging, audio and video, text-to-speech conversion, and other data management technologies which are integrated on computer platforms.

Figure 3:
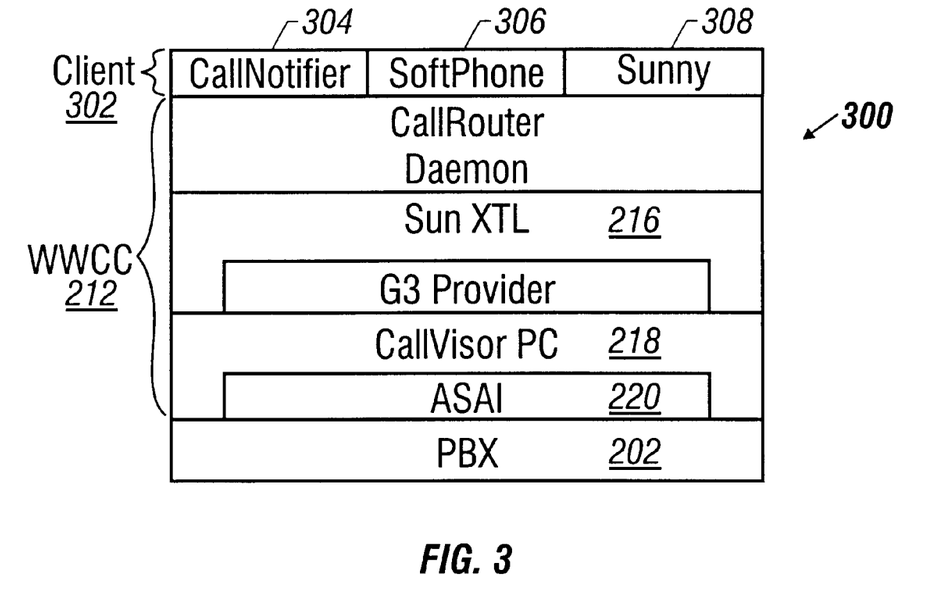
FIG. 3 is a schematic relational diagram illustrating an embodiment of a computer-telephone communication interface in which an Electronic Call Request is implemented.

Referring to FIG. 3, a schematic relational diagram illustrates an embodiment of a computer-telephone communication interface 300 in which an Electronic Call Request is implemented. The computer-telephone communication interface 300 designates interactions between client operations 302, the call center central server 212, and the PBX interface 202. The computer-telephone communication interface 300 has full access to all connected PBXs. In addition, the computer-telephone communication interface 300 has full access to PBX functions including functions of initiating calls and responding to calls.

The client operations 302 include a CallNotifier interface 304, a softphone 306, and a software agent 308. The CallNotifier interface 304 is used by an entity, called an agent, that answers a call to an automatic call distribution (ACD) system operating in the computer-telephone communication interface 300.

The softphone 306 is a graphical user interface (GUI) represented on a computing device 206 as a pseudo-telephone. The softphone 306 contains the functionality of an actual physical telephone such as hold, transfer and conference functions, allowing users to make telephonic interconnections using the computing devices 206. In addition, the softphone 306 enables editing including cutting and pasting of messages. Most users that are internal to the local PBX system 200 access the call center central server 212 using the softphone 306.

Using the GUI in the form of the softphone 306, a user specifies routing criteria such as the product and type of problem, request, issue or concern of a customer. Based on these customer considerations, messages are forwarded or routed to an agent or group of agents on a functional basis without specifying particular extensions or telephone numbers. For messages that are suitably routed or forwarded to a plurality of agents, the softphone 306 allows users to sequence through a series of numbers until a person answers the request. When the request is answered, the telephone rings on the user side and the dialed number side, extending the functionality of a conventional Automatic Callback operation.

The software agent 308 is a program that serves as a user interface to systems and applications such as SunService™ systems, including the call center central server 212, which are accessed by the network link 204. The software agent 308 interacts with customers who use the network link 204 to access the systems and applications and serves to centralize all of the customer interactions with the systems and applications. The software agent 308 supports authentication of messages, entitlement verification, and Electronic Call Requests between customers and services. The software agent 308 operates to support a customer and as a virtual support engineer to assist a customer to define problems, trouble-shoot problems, and solve the problems. A customer invokes the software agent 308 by typing phrases or through use of a graphical user interface (GUI). The software agent 308 is used to refine problem statements, access a product assistance help function such as a SunSolve™ system, log a service order for tracking problems. The software agent 308 is further used to invoke Electronic Call Requests (ECR), requesting a call with or without waiting on the telephone. The software agent 308 obtains a status of problems, requests, and other issues addressed by the computer-telephony system. The software agent 308 also performs a surveillance function that searches and returns information regarding status changes of service orders as the orders pass through various internal service organizations.

The software agent 308 supplies enhanced control over problems, request and other issues raised by a customer. The software agent 308 uses artificial intelligence schemes to address often-occurring requests, problems, and issues that have predictable solutions before the problems, requests and issues have escalated to the level of a human agent. When the problems have escalated to the level of human intervention, the software agent 308 supplies additional information to the engineers and agents for handling the problems, requests and issues.

The software agent 308 includes a functionality of loading application logic over a network, reducing the amount of logic internal to the agent for the particular application. For example, upon request a file is downloaded to define an applet that is compatible with the software agent 308. Upon initialization, a greeting applet is downloaded and presented on a GUI, displaying several menus and a text subwindow into which a user may enter instruction commands. If the user requests a specific applet, the requested applet is downloaded. If the user enters a phrase, data is uploaded to the call center central server 212 which performs a data search and downloads an applet most suitable with respect to the phrase. If no suitable applet is found, the GUI displays the closest options and requests further input from the user. Throughout an interactive session, a running log of the applet information is maintained including a log of actions performed by the applets. Like a browser, the user may maintain "bookmarks" of the applets that are periodically run.

The applets have decision-making capacity. When an applet determines that a particular number is to be dialed, the applet activates downloading of a telephony applet that allows the user to initiate, attain status information, and terminate Electronic Call Requests (ECR). When a user has a question about a particular system, network, or software, a "help" applet, such as a SunSolve™ applet, is downloaded to assist the user to debug problems.

The software agent 308 serves as a user interface to many types of systems and applications, for example including customer management, desktop teleservices, remote access, and collaborative multimedia. Customer management is the process, services, and company infrastructure established to support and manage customer interactions including call center management. SunXTL™ Platform 216 supplies the customer management operations of integrating communications to streamline call control and supporting merging and routing of customer data. Customer facilities supported by SunXTL™ Platform 216 include Interactive Voice Response (IVR), Automatic Call Identification (ACI), Dialed Number Identification (DNI), automated facsimile identification, and integrated imaging, for example.

Desktop teleservices include workstation-based telephone answering machine applications to allow users to efficiently place, receive and manage telephone calls. For example, graphical user interfaces (GUIs) using desktop teleservices automate information lookup such as rolodex referencing and telephone dialing. Remote access operates supplemental to the operations of placing and receiving calls from a workstation to allow users to place calls to a workstation from any telephone. Users call a workstation and access applications and data through DTMF signaling, or through speech using speech recognition operations of the workstation. Applications employing speech synthesis include Interactive Voice Response (IVR), electronic mail, and electronic calendars. Graphical data is retrieved by instructing the application to render the data as a facsimile and sending the data to a convenient facsimile device. Automated Call Distribution (ACD) applications using teleservice facilities across communication media such as ISDN facilitate simplified call routing. Collaborative multimedia is enterprise-wide, one-to-one, and one-to-many communication among multimedia workstations connected through telephone networks to allow communication among geographically dispersed locations using audio, video, and other media. Realtime, distributed collaboration is attained through integration of workstations, multimedia and telephony. Desktop teleconferencing and shared white board applications leverage computer-telephony integration by enabling users to share applications simultaneously while conversing.

CallRouter Daemons 214 are typically implemented in software and function to analyze and realize the informational content of a phone message and associated phone data for conversion to logical signals. The CallRouter Daemons 214 are daemons in the middle layers of network communication that determine a routing for calls and issue routing requests back to the CallvisorPC software 218. The implementation and usage of daemon programs are well-known in the art. The CallRouter Daemons 214 include a storage for logging and recording data associated with a plurality of Electronic Call Requests (ECR). The CallRouter Daemons 214 interface with a plurality of information servers that can supply supplemental data relating to an ECR to the associated data stream of the ECR and information used for rerouting telephone calls.

An Electronic Call Request (ECR) assigns a unique identifier (ID) relating to the associated telephone call. The identifier is stored and routed to follow the actual telephone call. The identifier is universally unique, as opposed to locally unique, so that ECR data is associated with the associated telephone call on a world-wide basis.

The CallRouter Daemons 214 obtain Direct Inward Dialing (DID), Automatic Number Identification (ANI) and other data from the PBX interface 202 and, depending on local parameters and configuration, determine and direct routing of the call. The CallRouter Daemons 214 run on SPARCservers™ and SPARCstations™ and are interconnected via TCP/IP network link 204 connections. In some conditions, multiple computing devices 206 running CallvisorPC software 218 are connected to one CallRouter Daemon 214 to efficiently transfer calls. For example, one CallRouter Daemon 214 may have both internal local configurations and global configurations replicated to each CallRouter Daemon. The individual CallRouter Daemons 214 probe any profile database storage 205 requested by a call. The CallRouter Daemons 214 also supplies information to a configuration database that records substantially all information relating to a telephone call and the associated Electronic Call Request (ECR).

A CallRouter Daemon 214 can be connected to other CallRouter Daemons 214. When a call is routed from a first CallRouter Daemon 214 to a second, the first CallRouter Daemon 214 preforwards the associated data and directs the PBX to route the associated telephone call to a PBX that is connected to the second CallRouter Daemon 214. Accordingly, the receiving PBX does not have to fetch the data after receiving a call, since the data is already present.

External customers can obtain access to the call center central server 212 and services and applications on the network link 204 without using the software agent 308 through usage of the Internet or World Wide Web (WWW). However, full access to the call center central server 212 and systems is only available through usage of the software agent 308. In particular, external users with limited access rights are allowed to reach a selected subset of extensions and allowed to create and check status of Electronic Call Requests.

Figure 4A:
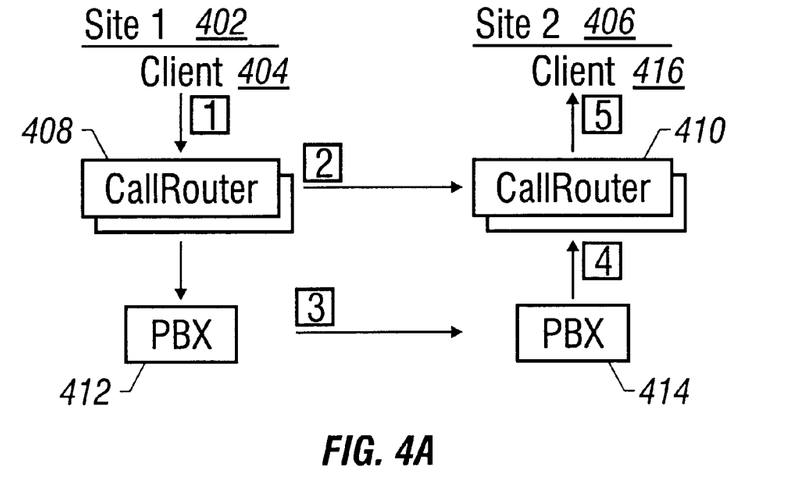
FIGS. 4A and 4B respectively show a schematic block diagram and a flowchart illustrating a method for call routing.
Figure 4B:
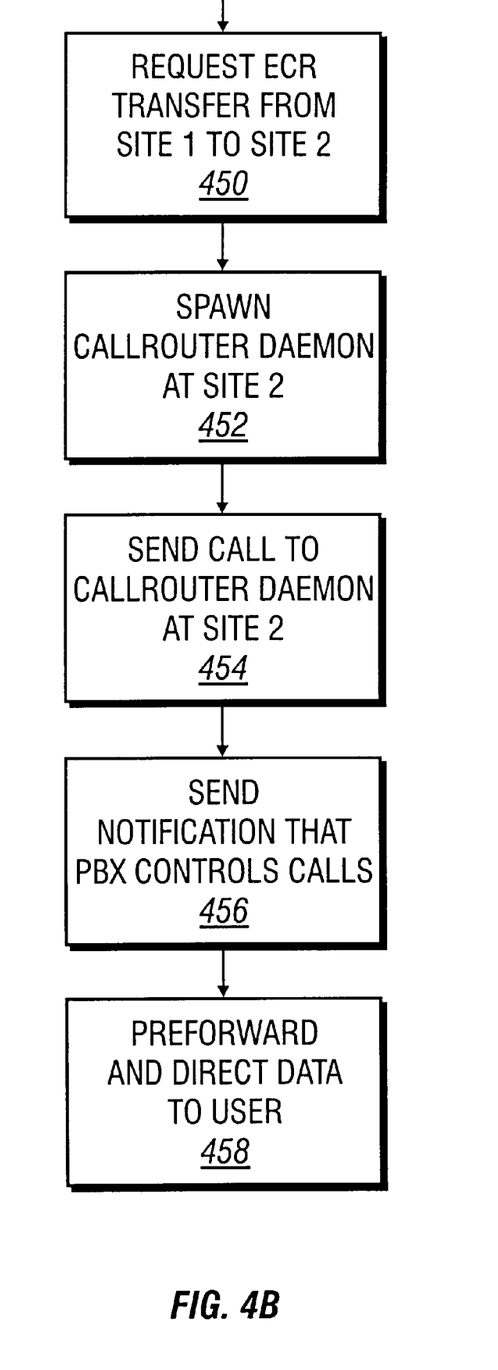

Referring to FIGS. 4A and 4B, a schematic block diagram and a flowchart respectively illustrate a method for call routing. At a first site 402, a client process 404 makes a transfer request to a second site 406 in an operation 450. A CallRouter 408 at the first site 402 determines the receiving location, logs the Electronic Call Requests (ECR) and stores data associated with the ECR, assigns a universally unique identifier (ID) relating to the associated telephone call, pre-sends the data to the receiving site (the second site 406). In operation 452, CallRouter 408, spawns a CalRouter Daemon 410 at the second site 406. A PBX 412 at the first site 402 is directed to send the call to the CallRouter Daemon 410 at the second site 406 in an operation 454. A PBX 414 at the second site 406 sends the notification that the PBX 414 controls the call in an operation 456. In an operation 458, the CallRouter Daemons 408 and 410 at the first site 402 and the second site 406, respectively, pre-forward or direct the data to a user 416 at the second site 406. The receiving PBX does not have to fetch the data after receiving a call, since the data is already present.

Figure 5:
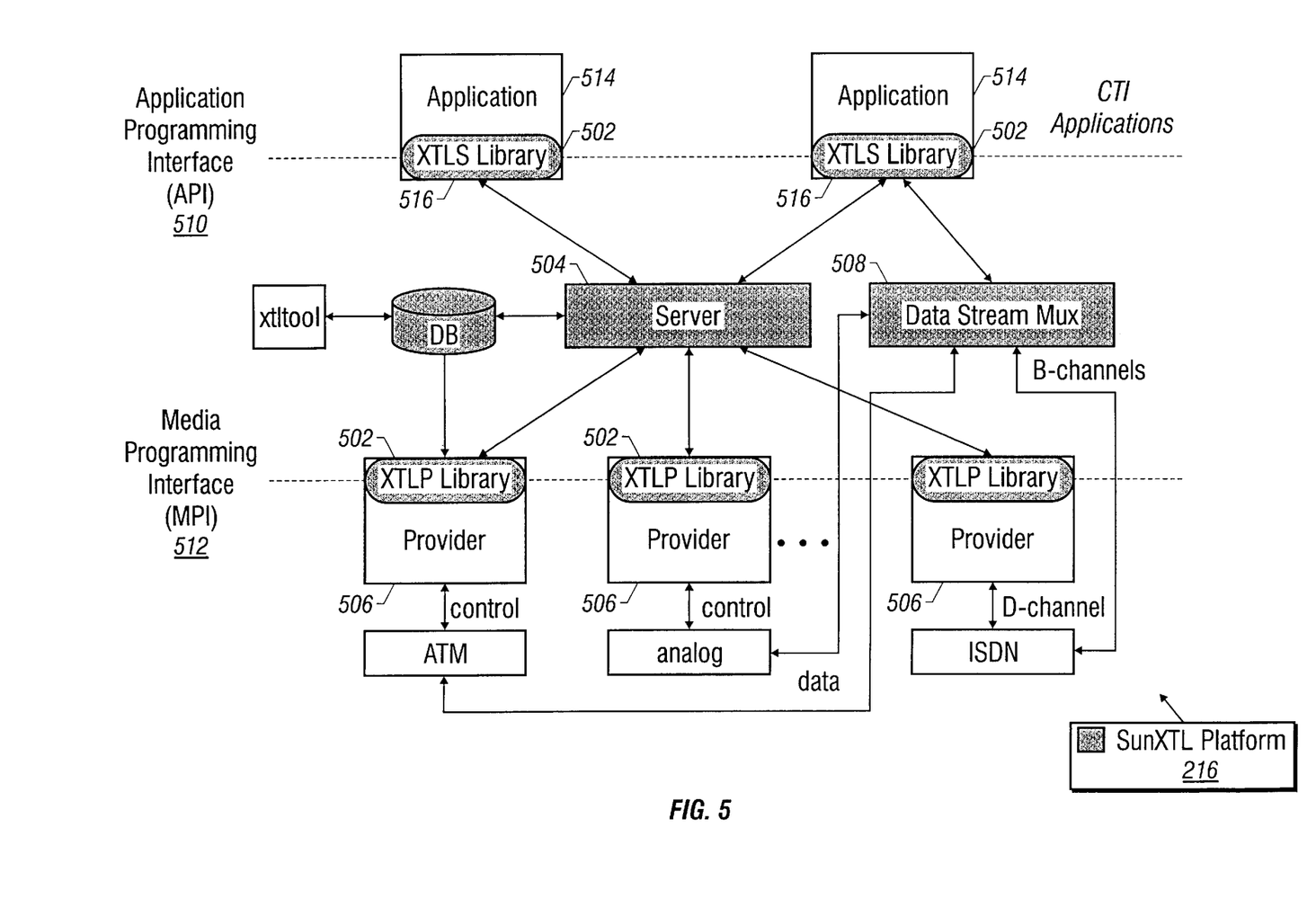
FIG. 5 is a schematic block diagram illustrating a computer-telephony software platform.

Referring to FIG. 5, a schematic block diagram illustrates a computer-telephony software platform, in the illustrative embodiment a SunXTL™ Platform 216. The SunXTL™ Platform 216 forms a basic software architecture for desktop telephone and enterprise-level, client-server telephony applications. The SunXTL™ Platform 216 furnishes standardized interfaces and services using object-oriented design, modular interfaces, and extensibility. The SunXTL™ Platform 216 performs several functions including support of call center management applications such as customer service center, call router, telemarketing center, and control of PBX call control functions for a distributed computing environment. The SunXTL™ Platform 216 supports desktop computer-telephony applications such as a "Feature Phone" GUI, remote access via DTMF, personal voice mail and the like, and shared access of workstation telephony hardware among several applications. The SunXTL™ Platform 216 supports transparent porting between PBX analog, ISDN, ATM, and other communication media technologies. The SunXTL™ Platform 216 supports simple access to common voice services and enables specialized or non-voice services including facsimile, modem, video, and compression functionality.

The SunXTL™ Platform 216 is a multilayered software architecture with several components including SunXTL™ libraries 502, a SunXTL™ server 504, one or more providers 506, and a data stream multiplexor 508. The SunXTL™ libraries 502 supply high-level, object-oriented programming interfaces including a SunXTL™ Application Program Interface (API) 510 for creation of applications and a SunXTL™ Media Platform Interface (MPI) 512, for creation of providers. The SunXTL™ server 504 supplies multi-client and multi-device support. The SunXTL™ server 504 is a central communication interface for teleservices, resource management, and security. The providers 506 are device-specific software entities that enable the telecommunications device to communicate with or be controlled by the SunXTL™ Platform 216 and applications of the SunXTL™ Platform 216. The providers 506 are used by applications to set up, control and terminate telephone calls in a consistent manner. The data stream multiplexor 508 is used by applications to access and share data channels associated with a telephone call.

A SunXTL™ application 514 is linked with an SunXTL™ API library 516 (known as XTLS) to establish communications between the SunXTL™ application 514 and the SunXTL™ server 504. The SunXTL™ API library 516 uses an asynchronous, symmetric messaging protocol which is implemented using a Solaris loopback transport mechanism.

In service of the SunXTL™ application 514, the SunXTL™ server 504 communicates with a provider 506 to place and receive telephone calls. A SunXTL™ application 514 may access the data associated with a call by acquiring a data stream from the SunXTL™ API 510. The SunXTL™ API 510, a teleservices server, and the XTL provider 506 interact to deliver the data stream to the application.

The SunXTL™ API 510 first connects to the data stream multiplexor 508. Through the SunXTL™ API library 516 and protocol, the API instructs the SunXTL™ server 504 to connect the data channel associated with the call to the data stream multiplexor 508 connection of the API. The SunXTL™ server 504 connects the data channel by requesting the SunXTL™ provider 506 to link the data channel under the data stream multiplexor 508 and instructs the data stream multiplexor 508 to splice the data channel to the data stream multiplexor 508 connection of the API. The application is thus enabled to use the data stream multiplexor 508 for exchanging data with the data channel associated with the call by using a usual STREAMs interface.

The lowest layer of the SunXTL™ API 510 is a message passing interface between an application and the teleservices server. The server application interface includes the call control functionality of the provider interface 506 as well as support for data channel access, support for multiple client applications accessing the SunXTL™ server 504, security management, resource contention and sharing.

Message passing within the teleservices environment is implemented using remote procedure calls. Messages are one-way and assume a reliable connection between the sender and receiver.

The access method to the lowest layer of the interface is like a Remote Procedure Call (RPC). To send a message, the user calls objects with names corresponding to the message name and arguments corresponding to the message contents. When a message is received, a callback object is invoked. The callback object name corresponds to the name of the message and the arguments of the method correspond to the contents.

To more easily use the RPC interface, a library containing default callback functions is supplied. The defaults can be overridden by supplying application-specific functions and linking the application-specific functions ahead of the default library. The next higher layer of the teleservices interfaces, the object-oriented interfaces, are constructed using application-specific functions. The default library also supplies functions for handling security interactions with the SunXTL™ server 504, functions for acquiring and accessing the data channel of a call, and other low-level functions.

The object-oriented interface manages connection to servers via "Server objects", handles the creation and answering of telephone calls via "Provider objects", and the control or status reporting of individual calls via "Call objects". Instead of supplying or overriding the callback functions using the linker, callbacks are supplied as methods of the Provider objects or the Call objects. Thus, an application handles individual classes of calls and methods specific to those calls.

The object-oriented layer hides the interaction with the lower-level protocol messages although the object-oriented layer is accessible using Message objects. The object-oriented interface facilitates management of multiple calls, multiple types of calls, and calls using multiple servers by the application.

The SunXTL™ API 510 defines the model and control techniques for developing computer-telephony applications. The SunXTL™ API 510 supplies a high-level program model for accessing the functionality of telephone services, security management, and concurrency.

The SunXTL™ API 510 includes functionality for placing a call, registering with the SunXTL services to answer a call, enabling call control features, sending and detecting DTMF tones, and enabling security and sharing of calls between processes.

The SunXTL™ API 510 is used by applications to manage the communication between the application program and the teleservices server process. The SunXTL™ API 510 represents objects which the application programmer may utilize to send and receive messages.

Figure 6:
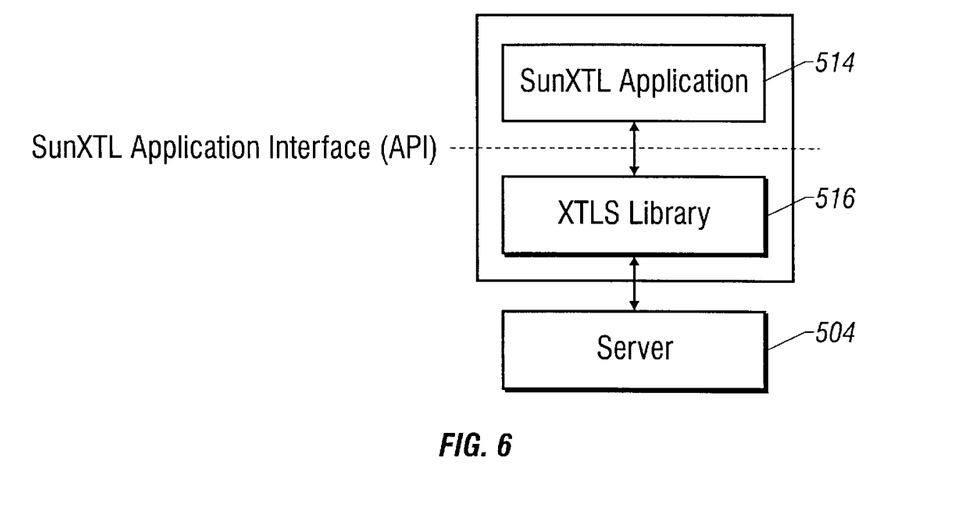
FIG. 6 is a schematic block diagram illustrating an interface between a SunXTL™ application, the SunXTL™ API library, and the SunXTL™ server.

Referring to FIG. 6, a schematic block diagram illustrates an interface between a SunXTL™ application 514, the SunXTL™ API library 516, and the SunXTL™ server 504. The SunXTL™ API library 516 supplies an interface defined as an extension to the Teleservices Provider API (SunXTL™ Media Platform Interface (MPI) 512) and protocol. The SunXTL™ Media Platform Interface (MPI) 512 allows multiple applications to share access to multiple providers through the teleservices server. The SunXTL™ API library 516 defines messages for managing application requests passed to the server including (a) call control and creation, (b) data stream control, allocation and interconnection, (c) call ownership and security with resource sharing, and (d) management of call monitoring and status logging.

The Teleservices Application Library includes a C++ client library for defining messages. The Teleservices Application Library is independent of the protocol specification.

Figure 7:
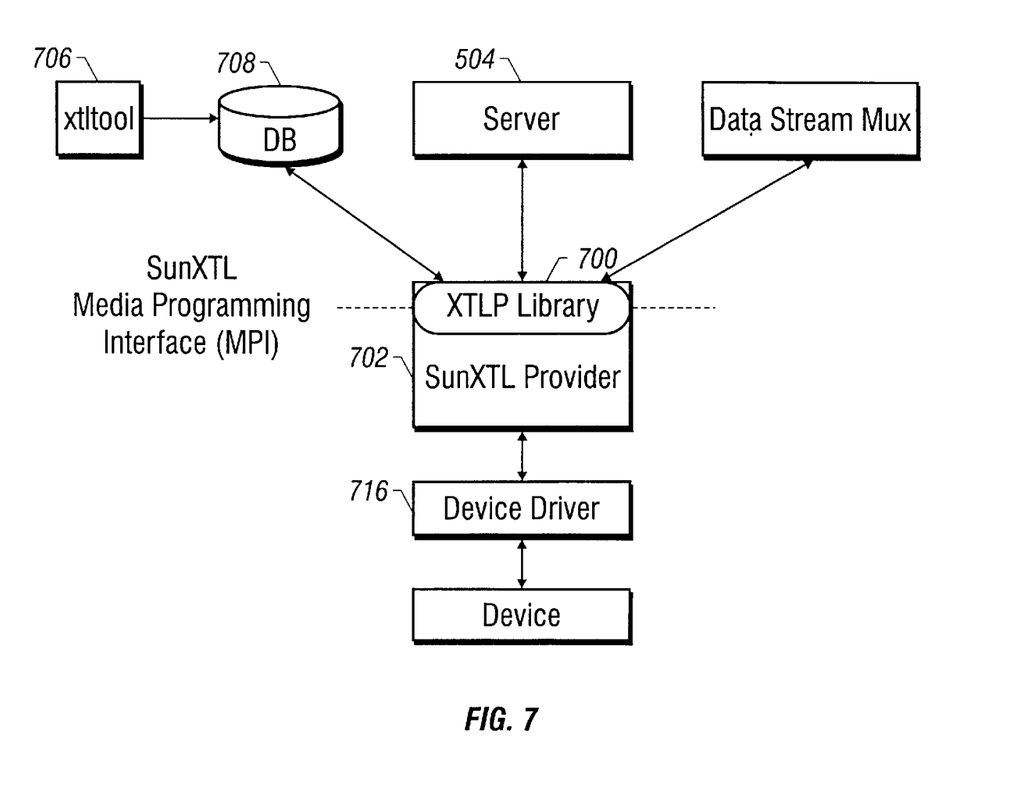
FIG. 7 is a schematic block diagram depicting an embodiment of a Teleservices Application Library.

Referring to FIG. 7, a schematic block diagram depicts an embodiment of a Teleservices Application Library 700. The Teleservices Application Library 700, manages the initialization, control and termination of telephone call connections in a device-independent manner. The hardware and internal protocol specifics on the underlying telecommunication technology are hidden beneath the SunXTL™ Media Platform Interface (MPI) 512 which supplies a standard interface, independent of the communications transport mechanism.

A different Teleservices Application Library 700 supports each service, device or subsystem installed on a system. In various embodiments, implementations of the Teleservices Application Library 700 are developed to support local switch-dependent protocols, vertical applications or software extensions, and alternative telephony technologies such as analog or ATM, for example.

When the Teleservices Application Library 700 is used with ISDN, the workstation functions as Terminal Equipment (TE), allowing the system to operate in the manner of a telephone.

Depending on the underlying communications technology, the programming abstractions supported by the Teleservices Application Library 700 include call hold, call transfer, dropping of a call, forwarding, and call conferencing.

A SunXTL™ Provider 702 supports a single client application, the SunXTL™ server 504. The SunXTL™ Provider 702 is program code for interfacing between the SunXTL™ server 504 and a device-specific driver 716. A provider presents a common appearance to correctly map the provider's protocol via the Teleservices Application Library 700 used to communicate to the SunXTL™ server 504. Thus, multiplexing and de-multiplexing of multiple clients using the Teleservices Application Library 700 is performed by software above the SunXTL™ Media Platform Interface (MPI) 512. The SunXTL™ Provider 702 interfaces to a configuration tool 706, and a configuration database 708.

The configuration database 708 contains information relating to providers that are available in a local SunXTL environment. Objects of the SunXTL™ Provider 702 maintain configuration files in the configuration database 708 as lists of keys and values that define specific provider characteristics for successful operation of the provider. Objects of the SunXTL™ Provider 702 establish connections over telephone lines using lower-level protocols that control telephone hardware and manage the connections. The entities that implement the low-level protocols are also called providers. The SunXTL™ Provider 702 establishes connections to a valid provider to perform a telephone function.

A SunXTL™ application 514 uses query functions of the configuration database 708 to allow an object of the SunXTL™ Provider 702 to successfully establish connections. SunXTL™ applications 514 use query functions to check that the configuration database 708 is appropriately set up, access a list of names or aliases of available providers, obtain and free key-value lists, and access provider key and value information. The SunXTL™ environment includes an OpenWindows-based tool, called xtltool, as an interface for managing the configuration database 708.

Figure 8:
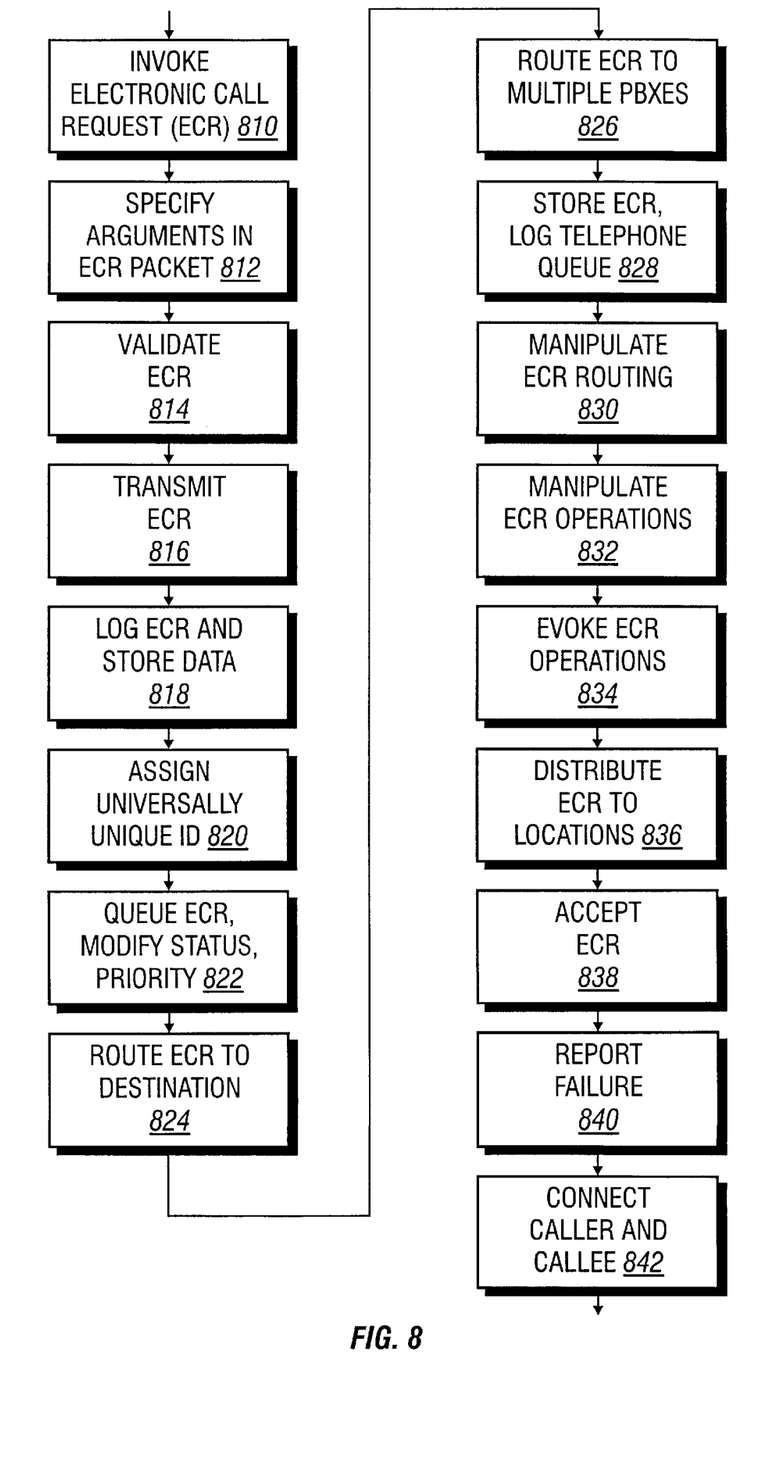
FIG. 8 is a flowchart illustrating operations of an Electronic Call Request (ECR).

Referring to FIG. 8, a flowchart illustrates operations of an Electronic Call Request (ECR). In the illustrative embodiment, the Electronic Call Request (ECR) is created using software. The Electronic Call Request (ECR) is a software object that serves as an agent for initiating a call to a destination from a source and monitoring the destination to determine when the call is answered. A user at either an internal site or an external site invokes an Electronic Call Request (ECR) using an ECR invocation technique 810 selected from a plurality of techniques. Such techniques include entry into an input device of a workstation or computer system using a mouse or keyboard, for example. Other techniques include conversion of a telephone call into a signal or electronic form. In another example, a customer at an external site may invoke the Electronic Call Request (ECR) on the World Wide Web using a browser.

Alternatively, an internal user or external customer may invoke the Electronic Call Request (ECR) using the software agent 308. Also the software agent 308 may invoke an Electronic Call Request (ECR) automatically as a result of a particular analysis or monitoring. The software agent 308 calls the CallRouter Daemon 214 to directly create the Electronic Call Request (ECR).

In another example, the user may telephone a customer service system such as a Sun TeleRequest Service system which logs the call and transfers the call to a Vector Directory Number (VDN). The VDN is a callable extension that has assigned vectors. A vector is a set of instructions followed by a PBX when the call enters the VDN assigned to the vector. The VDN has an assigned vector including an instruction that activates a communication between the PBX and an adjunct. The adjunct is the CallvisorPC software 218 which directs the CallRouter Daemon 214 to create an Electronic Call Request (ECR).

In another example, a graphical user interface (GUI) such as the call center central server 212, termed a "World Wide Call Center" (WWCC), creates the Electronic Call Request (ECR).

In combination with the invocation 810 of the Electronic Call Request (ECR), a user optionally specifies one or more arguments in an Electronic Call Request (ECR) packet 802 in an operation 812. For example, the Electronic Call Request (ECR) specifies the problem, issue or request to be addressed. An argument may be used to request a particular expertise of an answering agent.

The operation of specifying arguments 812 may be directed interactively using the artificial intelligence software agent 308. For example, the software agent 308 may interrogate the caller to classify the problem, request or issue addressed by the caller.

An Electronic Call Request (ECR) may be assigned varying priorities from a low priority to a high priority.

In an operation 814, the Electronic Call Request (ECR) is validated. For example, an ECR invoked on the World Wide Web may be validated using an authorized user identification (UID) such as a SunServiceID.

In an operation 816, the user transmits the ECR using a command such as a "Send" command. In an alternative operation, the caller requests the software agent 308 to invoke the Electronic Call Request (ECR) and the software agent 308 performs the request.

In operation 818, the CallRouter Daemons 214 log the ECR and records data associated with the ECR.

In operation 820, the Electronic Call Request (ECR) assigns a universally unique identifier (ID) relating to the associated telephone call. The identifier is stored and routed to follow the actual telephone call.

In operation 822, the Electronic Call Request (ECR) executes a queuing algorithm and performs checking and modification of status, priority, and other data.

In operation 824, the Electronic Call Request (ECR) is directed to a particular destination. The destination may be directly specified by the caller or may be automatically determined according to the particular ECR request and the information contained in the ECR packet 802. Various systems such as the software agent 308 may perform the analysis and determination of the destination. In some cases, a caller which is internal to a Computer Telephony (CT) system makes a call to a destination external to the system. In these cases, the Electronic Call Request (ECR) agent either calls the number and makes the connection directly, or the agent monitors the external line and calls back the internal caller when an answering party answers the telephone at the external destination.

In operation 826, when a call is optionally and selectively routed from a first CallRouter Daemon 214 to a second, the first CallRouter Daemon 214 preforwards the associated data and directs the PBX to route the associated telephone call to a PBX that is connected to the second CallRouter Daemon 214. The receiving PBX receives the data after receiving a call without fetching, since the data is already present.

The Electronic Call Request (ECR) is an electronic or software entity that assists communications and messaging by operating in a computing and network system in place of a telephone call. In operation 828, the Electronic Call Request (ECR) is made a storage and communication entity in a computing and network environment and logged in a telephone queue.

In an operation 830, the caller optionally and selectively graphically manipulates the routing of the Electronic Call Request (ECR) using a graphical user interface (GUI) to navigate the telephone network.

In an operation 832, the Electronic Call Request (ECR) is optionally and selectively manipulated, for example by the caller using a graphical user interface (GUI), to activate a telephone call at the command of a human or computer or network system agent, generating a telephone call both to the caller and the call target. If the Electronic Call Request (ECR) is converted into a telephone call, a record of the Electronic Call Request (ECR) is maintained in the system.

In an operation 834, a system such as the SunXTL™ API 510 or a system operating in conjunction with the SunXTL™ API 510 reads the ECR packet and may perform an operation depending on the content of the ECR. For example, a system may create a service order from customer information accessed from the ECR packet 802. In a system employing the software agent 308, the software agent 308 determines a wait-time for addressing the caller request depending on the support conditions of the destination service. Periodically, the software agent 308 updates the wait-time.

In another example, a system may place the customer in a hold condition for a selected time. When the time has elapsed, the system gives the customer the option to continue holding, wait for a callback or talk to a call coordinator immediately.

In operation 836, the Electronic Call Request (ECR) is distributed to one or more destinations. For example, the ECR may be received by one or more service engineers having a particular expertise. Typically a pop-up graphic is generated at a display terminal of the destinations.

In operation 838, the Electronic Call Request (ECR) is accepted. If the ECR is distributed to a plurality of destinations, the first destination to accept the ECR is designated the acceptor and the ECR at the other destinations is canceled.

In operation 840, if a telephone call associated with an Electronic Call Request (ECR) fails due to the failure of a human being to pick up a telephone or answering of the telephone using an electronic telephone answering machine, a failure response is reported back to the Electronic Call Request (ECR) and logged in the record of the Electronic Call Request (ECR). A telephone answering machine answers a call with a signal that designates the automatic, nonhuman receipt of the call.

In operation 842, the telephones of the caller and the acceptor simultaneously ring and commence conversation. The Electronic Call Request (ECR) establishes a connection between the destination and the source when both the source and destination entities are available. For example, when the ECR agent establishes that both the calling party at the source and the answering party at the destination are available, the ECR rings the telephones of the calling party and the answering party. A connection is complete when the calling party and the answering party pick up their telephones.

While the invention has been described with reference to various embodiments, it will be understood that these embodiments are illustrative and that the scope of the invention is not limited to them. Many variations, modifications, additions and improvements of the embodiments described are possible. For example, those skilled in the art will readily implement the steps necessary to provide the structures and methods disclosed herein, and will understand that the described parameters, materials, and dimensions are given by way of example only and can be varied to achieve the desired structure as well as modifications which are within the scope of the invention. Variations and modifications of the embodiments disclosed herein may be made based on the description set forth herein, without departing from the scope and spirit of the invention as set forth in the following claims.

For example, although the systems are generally described as a software implementation, in other embodiments the systems, including the software agent, may be implemented in a hardware form.

Accordingly, the present invention is defined solely by the claims which follow and their full range of equivalents.

What is claimed is:

1. A method of tracking and controlling a telephone call comprising:
   receiving a telephone call request from a caller;
   creating an observable Electronic Call Request (ECR) in response to the receipt of the telephone call request;
   routing the Electronic Call Request (ECR) to a destination;
   activating a CallRouter Daemon;
   logging the Electronic Call Request (ECR) through operation of the CallRouter Daemon; and
   recording data associated with the Electronic Call Request (ECR) through operation of the CallRouter Daemon.

2. A method according to claim 1, wherein receiving the telephone call request further comprises:
   entering a request by manipulating an input device connected to a computer system or workstation.

3. A method according to claim 1, wherein receiving the telephone call request further comprises:
   invoking an Electronic Call Request (ECR) via a network connection using a network browser application.

4. A method according to claim 1, wherein receiving the telephone call request further comprises:
   creating an artificial intelligence agent; and
   the artificial intelligence agent directly calling a CallRouter Daemon to directly invoke an Electronic Call Request (ECR).

5. A method according to claim 1, further comprising:
   monitoring the destination to determine whether and when the Electronic Call Request (ECR) is answered.

6. A method according to claim 1, further comprising:
   specifying an argument to the telephone call request; and
   storing the argument in association with the Electronic Call Request (ECR).

7. A method according to claim 1, further comprising:
   creating an artificial intelligence agent; and
   interrogating the caller via the artificial intelligence agent to classify a problem, request or issue raised by the caller.

8. A method according to claim 1, further comprising:
   validating the Electronic Call Request (ECR) using an authorized user identification.

9. A method according to claim 1, further comprising:
   assigning the Electronic Call Request (ECR) a universally unique identifier relating to the telephone request; and
   storing and routing the universally unique identifier to follow the telephone call.

10. A method according to claim 1, wherein routing the Electronic Call Request (ECR) further comprises:
    directly specifying a destination by the caller.

11. A method according to claim 1, wherein routing the Electronic Call Request (ECR) further comprises:
    acquiring telephone call information;
    analyzing the telephone call information and the telephone call request; and
    determining a suitable address on the basis of the analysis.

12. A method according to claim 1, further comprising:
    manipulating the routing of the Electronic Call Request (ECR) using a graphical user interface (GUI).

13. A method according to claim 1, further comprising:
    a system object accessing Electronic Call Request (ECR) information;
    the system object analyzing the Electronic Call Request (ECR) information; and
    the system object performing an operation based on the Electronic Call Request (ECR) information.

14. A method according to claim 1, wherein routing further comprises:
    routing the Electronic Call Request (ECR) to a plurality of destinations.

15. A method according to claim 1, further comprising:
    delivering notification of the Electronic Call Request (ECR) to a destination.

16. A method according to claim 1, further comprising:
    delivering notification of the Electronic Call Request (ECR) to a destination; and
    generating a pop-up on a display at the destination.

17. A method according to claim 1, further comprising:
    determining when an entity at a calling source and the destination are available;
    ringing telephones at the calling source and the destination substantially simultaneously; and
    completing a telephone connection upon pickup of the calling source telephone and the destination telephone.

18. A computer program product comprising:
    a computer usable medium having computable readable code embodied therein implementing the method according to claim 1.

19. A method of tracking and controlling a telephone call comprising:

receiving a telephone call request from a caller;

telephoning a customer service system with a telephone message;

logging receipt of the telephone message at the customer service system;

transferring the telephone message to a Vector Directory Number;

executing a vector designated by the Vector Directory Number at a private branch exchange, the vector directing a communication between the private branch exchange and an adjunct that activates a CallRouter Daemon to create an observable Electronic Call Request (ECR) in response to the receipt of the telephone call request; and routing the Electronic Call Request (ECR) to a destination.

20. A computer program product comprising:

a computer usable medium having computable readable code embodied therein including:

instructions for receiving a telephone call request from a caller;

instructions for creating an observable Electronic Call Request (ECR) in response to the receipt of the telephone call request;

instructions for routing the Electronic Call Request (ECR) to a destination;

instructions for activating a CallRouter Daemon;

instructions for logging the Electronic Call Request (ECR) through operation of the CallRouter Daemon; and instructions for recording data associated with the Electronic Call Request (ECR) through operation of the CallRouter Daemon.

21. A computer program product according to claim 20 wherein the instructions for receiving the telephone call request further comprise:

instructions for entering a request by manipulating an input device connected to a computer system or workstation.

22. A computer program product according to claim 20 wherein the instructions for receiving the telephone call request further comprise:

instructions for invoking an Electronic Call Request (ECR) via a network connection using a network browser application.

23. A computer program product according to claim 20, wherein the instructions for receiving the telephone call request further comprise:

instructions for creating an artificial intelligence agent; and instructions of the artificial intelligence agent including instructions for directly calling a CallRouter Daemon to directly invoke an Electronic Call Request (ECR).

24. A computer program product according to claim 20 further comprising:

instructions for monitoring the destination to determine whether and when the Electronic Call Request (ECR) is answered.

25. A computer program product according to claim 20 further comprising:

instructions for specifying an argument to the telephone call request; and instructions for storing the argument in association with the Electronic Call Request (ECR).

26. A computer program product according to claim 20 further comprising:

instructions for creating an artificial intelligence agent; and instructions for interrogating the caller via the artificial intelligence agent to classify a problem, request or issue raised by the caller.

27. A computer program product according to claim 20 further comprising:

instructions for validating the Electronic Call Request (ECR) using an authorized user identification.

28. A computer program product according to claim 20 further comprising:

instructions for assigning the Electronic Call Request (ECR) a universally unique identifier relating to the telephone request; and instructions for storing and routing the universally unique identifier to follow the telephone call.

29. A computer program product according to claim 20, wherein instructions for routing the Electronic Call Request (ECR) further comprise:

instructions for directly specifying a destination by the caller.

30. A computer program product according to claim 20, wherein instructions for routing the Electronic Call Request (ECR) further comprise:

instructions for acquiring telephone call information;

instructions for analyzing the telephone call information and the telephone call request; and instructions for determining a suitable address on the basis of the analysis.

31. A computer program product according to claim 20 further comprising:

instructions for manipulating the routing of the Electronic Call Request (ECR) using a graphical user interface (GUI).

32. A computer program product according to claim 20 further comprising:

a system object accessing Electronic Call Request (ECR) information;

the system object including:

instructions for analyzing the Electronic Call Request (ECR) information; and instructions for performing an operation based on the Electronic Call Request (ECR) information.

33. A computer program product according to claim 20, wherein instructions for routing firther comprise:

instructions for routing the Electronic Call Request (ECR) to a plurality of destinations.

34. A computer program product according to claim 20 further comprising:

instructions for delivering notification of the Electronic Call Request (ECR) to a destination.

35. A computer program product according to claim 20 further comprising:

instructions for delivering notification of the Electronic Call Request (ECR) to a destination; and instructions for generating a pop-up on a display at the destination.

36. A computer program product according to claim 20 further comprising:

instructions for determining when an entity at a calling source and the destination are available;

instructions for ringing telephones at the calling source and the destination substantially simultaneously; and instructions for completing a telephone connection upon pickup of the calling source telephone and the destination telephone.

37. A computer usable medium comprising:

a computer program product according to claim 20.

38. A computer program product comprising:

a computer usable medium having computable readable code embodied therein including:

instructions for receiving a telephone call request from a caller;

instructions for telephoning a customer service system with a telephone message;

instructions for logging receipt of the telephone message at the customer service system;

instructions for transferring the telephone message to a Vector Directory Number;

instructions for executing a vector designated by the Vector Directory Number at a private branch exchange, the vector directing a communication between the private branch exchange and an adjunct that activates a CallRouter Daemon to create an observable Electronic Call Request (ECR) in response to the receipt of the telephone call request; and instructions for routing the Electronic Call Request (ECR) to a destination.

39. A computer program product comprising:

a computer usable medium having computable readable code embodied therein including:

instructions for receiving a telephone call request from a caller;

instructions for creating an observable Electronic Call Request (ECR) in response to the receipt of the telephone call request;

instructions for routing the Electronic Call Request (ECR) to a destination;

instructions for activating a CallRouter Daemon;

instructions for logging the Electronic Call Request (ECR) through operation of the CallRouter Daemon; and instructions for recording data associated with the Electronic Call Request (ECR) through operation of the CallRouter Daemon.

* * * * *